United States Patent
Tarnoff et al.

(10) Patent No.: US 8,468,125 B2
(45) Date of Patent: Jun. 18, 2013

(54) AUTOMATICALLY MOVING MULTIDIMENSIONAL DATA BETWEEN LIVE DATACUBES OF ENTERPRISE SOFTWARE SYSTEMS

(75) Inventors: Finuala Tarnoff, Ashurst Southampton Hampshire (GB); David S. Bowen, York (GB); Leonard Roy Oppenheimer, Saint Paul, MN (US); John Martin Pitstick, Burnsville, MN (US)

(73) Assignee: International Business Machines Corporation, Armonk, NY (US)

( * ) Notice: Subject to any disclaimer, the term of this patent is extended or adjusted under 35 U.S.C. 154(b) by 1502 days.

(21) Appl. No.: 11/103,902

(22) Filed: Apr. 12, 2005

(65) Prior Publication Data

US 2006/0230067 A1 Oct. 12, 2006

(51) Int. Cl.
*G06F 7/00* (2006.01)

(52) U.S. Cl.
USPC ............ 707/610; 707/637; 709/217; 709/248

(58) Field of Classification Search
USPC ........... 707/999.104, 602, 610, 637; 709/217, 709/248
See application file for complete search history.

(56) References Cited

U.S. PATENT DOCUMENTS

| | | | |
|---|---|---|---|
| 4,878,175 A | 10/1989 | Norden-Paul et al. | |
| 5,247,611 A | 9/1993 | Norden-Paul et al. | |
| 5,325,478 A | 6/1994 | Shelton et al. | |
| 5,546,580 A | 8/1996 | Seliger et al. | |
| 5,546,680 A | 8/1996 | Barma et al. | |
| 5,590,259 A | 12/1996 | Anderson et al. | |
| 5,701,423 A * | 12/1997 | Crozier | 707/102 |
| 5,899,998 A | 5/1999 | McGauley et al. | |
| 6,167,405 A | 12/2000 | Rosensteel, Jr. et al. | |
| 6,496,913 B1 | 12/2002 | Taugher et al. | |
| 6,546,095 B1 * | 4/2003 | Iverson et al. | 379/201.12 |
| 6,944,821 B1 | 9/2005 | Bates et al. | |

(Continued)

FOREIGN PATENT DOCUMENTS

| | | |
|---|---|---|
| EP | 0 501 180 A2 | 9/1992 |
| WO | WO 84/00426 | 2/1984 |
| WO | WO 00/42530 | 7/2000 |

OTHER PUBLICATIONS

Sanjay Goil and Alok Choudhary, "An Infrastructure for Scalable Parallel Multidimensional Analysis," *Scientific and Statistical Database Management, Eleventh International Conference*, IEEE Comput. Soc, US, Jul. 28, 1999 (pp. 102-111).

(Continued)

*Primary Examiner* — Hosain Alam
*Assistant Examiner* — Jieying Tang
(74) *Attorney, Agent, or Firm* — Shumaker & Sieffert, P.A.

(57) ABSTRACT

Techniques are described for sharing multidimensional data between software systems, such as enterprise software systems. Specifically, the techniques provide mechanisms for defining inter-application "links" for automatically moving data among different databases associated with the enterprise software systems. For example, a system may include a first database storing multidimensional data for a first software application, and a second database storing multidimensional data for a second software application. The system further includes an interface by which an administrator defines a link that specifies a source area of the first database and a target area of the second database. A link control module automatically moves multidimensional data from the source area to the target area in accordance with the link. The link control module may automatically move the multidimensional data directly between live portions of the respective databases.

10 Claims, 15 Drawing Sheets

U.S. PATENT DOCUMENTS

| | | | |
|---|---|---|---|
| 7,043,497 B1* | 5/2006 | Carty et al. | 707/101 |
| 7,082,427 B1* | 7/2006 | Seibel et al. | 707/4 |
| 7,191,183 B1* | 3/2007 | Goldstein | 707/101 |
| 7,197,502 B2* | 3/2007 | Feinsmith | 707/100 |
| 7,233,952 B1* | 6/2007 | Chen | 707/100 |
| 7,266,540 B2 | 9/2007 | Chung et al. | |
| 7,536,713 B1 | 5/2009 | Bartholomew | |
| 7,877,355 B2 | 1/2011 | Borgsmidt et al. | |
| 2004/0107255 A1 | 6/2004 | Ludwig et al. | |
| 2004/0162836 A1* | 8/2004 | Aronoff et al. | 707/100 |
| 2005/0278458 A1* | 12/2005 | Berger et al. | 709/248 |
| 2006/0022048 A1 | 2/2006 | Johnson | |
| 2006/0112153 A1 | 5/2006 | Bowen | |
| 2006/0112390 A1 | 5/2006 | Hamaoka | |
| 2006/0230025 A1 | 10/2006 | Baelen | |
| 2006/0230067 A1 | 10/2006 | Tarnoff et al. | |
| 2007/0027904 A1 | 2/2007 | Chow et al. | |
| 2008/0046481 A1 | 2/2008 | Gould et al. | |
| 2008/0249761 A1 | 10/2008 | Easterly | |
| 2008/0301155 A1 | 12/2008 | Borgsmidt | |

OTHER PUBLICATIONS

Joe Guerra, "Using Microsoft SQL Server Data Transformation Services with IBM Databases," dated Nov. 2002; Internet Article retrieved from URL:http://www.microsoft.com/sql/evaluation/compare/ibm/UsingMSSS-DTSwIBM-DBs.pdf (retrieved on Jul. 27, 2006) pp. 1-19.
International Search Report and Written Opinion from corresponding PCT Application Serial No. PCT/US2006/011993, mailed Aug. 14, 2006 (11 pages).
U.S. Appl. No. 10/996,855, filed Nov. 22, 2004, entitled "Export Queue for an Enterprise Software System," 24 pages.
International Preliminary Report on Patentability from corresponding PCT Application Serial No. PCT/US2006/011993 mailed Oct. 25, 2007 (7 pages).
U.S. Appl. No. 11/950,257, filed Dec. 4, 2007, entitled "Data Entry Commentary and Sheet Reconstruction for Multidimensional Enterprise System," 35 pages.
U.S. Appl. No. 11/954,415, filed Dec. 12, 2007, entitled "Automatically Moving Annotations Associated With Multidimensional Data Between Live Datacubes," 49 pages.
European Office Action from corresponding European Application Serial No. 06 740 237.0-1225 dated Jan. 28, 2010 (6 pages).
"XML Inclusions (XInclude) Version 1.0," Dec. 20, 2004, W3C, http://222.23.org/TR/2004/REC-xinclude-20041220, pp. 1-20.
Office Action from U.S. Appl. No. 11/900,895, dated Dec. 1, 2009, 26 pp.
Response to Office Action dated Dec. 1, 2009, from U.S. Appl. No. 11/900,985, filed Mar. 1, 2010, 16 pp.
Office Action from U.S. Appl. No. 11/900,985, dated May 28, 2010, 30 pp.
Amendment for U.S. Appl. No. 11/900,985, filed Aug. 27, 2010, 16 pp.
Notice of Allowance from U.S. Appl. No. 11/900,895, dated Sep. 20, 2010, 8 pp.
Office Action from U.S. Appl. No. 11/950,257, dated Feb. 1, 2010, 16 pp.
Response to Office Action dated Feb. 1, 2010, from U.S. Appl. No. 11/950,257, filed Apr. 29, 2010, 12 pp.
Office Action from U.S. Appl. No. 11/950,257, dated Jul. 21, 2010, 17 pp.
Pre-Appeal Brief Request for Review for U.S. Appl. No. 11/950,257, filed Oct. 19, 2010, 6 pp.
Appeal Brief for U.S. Appl. No. 11/950,257, filed Jan. 14, 2011, 26 pp.
Examiner's Answer to Appeal Brief filed Jan. 14, 2011, from U.S. Appl. No. 11/950,257, dated Mar. 25, 2011, 23 pp.
Reply Brief in response to Examiner's Answer, from U.S. Appl. No. 11/950,257, filed May 25, 2011, 13 pp.
Office Action from U.S. Appl. No. 11/954,415, dated Jan. 11, 2011, 21 pp.
Response to Office Action dated Jan. 11, 2011, from U.S. Appl. No. 11/954,415, filed Apr. 8, 2011, 13 pp.
Office Action from U.S. Appl. No. 11/954,415, dated Jun. 14, 2011, 20 pp.
Response to Office Action dated Jun. 14, 2011, from U.S. Appl. No. 11/954,415, filed Aug. 29, 2011, 5 pp.
Office Action from U.S. Appl. No. 11/954,415, dated Sep. 8, 2011, 20 pp.
Response to Office Action dated Sep. 8, 2011, from U.S. Appl. No. 11/954,415, filed Dec. 6, 2011, 15 pp.
Office Action from U.S. Appl. No. 11/954,415, dated Jan. 12, 2012, 22 pp.
Response to Office Action dated Jan. 12, 2012, from U.S. Appl. No. 11/954,415, filed Apr. 9, 2012, 14 pp.
Notice of Allowance from U.S. Appl. No. 11/954,415, dated Aug. 27, 2012, 8 pp.

* cited by examiner

FIG. 7

Administration Link - Element — 110

Description: — 111
Move Cost Drivers from Health Insurance Planning to Departmental P/L Planning (utorial3v73)

Pick the source and target applications:

Source application: — 112
Health Insurance Planning

Target application: — 113
tutorial3v73

From application state:
Production

To application state:
○ Development
● Production — 118

Source cube: — 114
Underwriting Margin

Target cube: — 115
Expenses

Map source to target dimensions:

Source dimensions: — 116
1 Underwriting Margin Calc
elist
2 Customers
4 Months

Target dimensions: — 117
Expenses
elist
Months
Versions

Map
Map All
Edit
Clear
Clear All

Help    Cancel    < Back    Next >    Finish

Administration Link - Element — 180

At least one unmapped source dimension exists. Select the items in each source dimension that should be loaded. If you select more than one item, the values for those item names will be aggregated.

Unmapped source dimensions:

elist

☑ All items (items added to the source in the future will also be included.) — 183

Available: — 181
- Healthcare Ins.Co
- Territory 1
- Territory 2

Included: — 182
- Agent 1
- Agent 2
- Agent 3
- Agent 4
- Agent 5

[ Help ]   [ Cancel ]  [ < Back ]  [ Next > ]  [ Finish ]

FIG. 15

AUTOMATICALLY MOVING MULTIDIMENSIONAL DATA BETWEEN LIVE DATACUBES OF ENTERPRISE SOFTWARE SYSTEMS

TECHNICAL FIELD

The invention relates to software systems and, in particular, enterprise software systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligent tools, enterprise reporting tools, project and resource management systems and other enterprise software systems.

In many situations, an enterprise may maintain multiple enterprise software systems. The enterprise software systems typically create and maintain separate multidimensional databases to collect and manage information to support the business processes. Each of the enterprise software systems is "current" from the perspective of their respective users. An enterprise often desires to share data between the different enterprise software systems. As one example, the user may wish to move multi-dimensional data from a financial planning system to a reporting system.

One conventional technique for moving the multidimensional data is to export the multidimensional data from one enterprise software system to the second enterprise software system. During this process, it is often required to "freeze" or "lock down" the first entire enterprise software system in order to export consistent data. As one example, some software systems must be brought offline before any export can be initiated to prevent any updates or data changes during the export process. During this process, users of the first enterprise software system are prevented from accessing and utilizing the software system.

Moreover, the multidimensional data often must be exported to an offline "staging area" of the second enterprise planning system. The staging area acts a temporary holding area while the multidimensional data can be processed and merged into the second enterprise planning system. As a result, conventional techniques for sharing data between enterprise software systems are often cumbersome and time-consuming.

SUMMARY

In general, the invention is directed to techniques for moving multidimensional data between software systems, such as enterprise software systems. Specifically, the techniques provide mechanisms for defining inter-system "links" for automatically moving data among different databases associated with the enterprise software systems.

As used herein, the term "link" generally refers to a software element (e.g., control information) that maps multidimensional data from one data source to another data source. For example, a link may map multidimensional data from one or more source enterprise software systems to one or more destination software systems. As another example, a link may map multidimensional data between multiple databases of a single enterprise software application. In addition to specifying the source and destination databases, each link provides a link definition that controls any data transformations to be applied when moving the multidimensional data. In this manner, the links control the mapping and synchronization of the multidimensional data, including control of past and future time versioning and dimensionality of the shared data.

In general, the links may be activated manually or embedded within macros to run at specific times or in response to certain events. Macros can be chained together, allowing links to be defined for moving data between multiple databases in a sequence.

Multiple levels of granularity are supported by different forms of links. For example, administrative links may be defined to move larger data sets associated with multiple users. In addition, user-controlled links may be defined on a per-user basis to move user-specific data.

In one embodiment, a system comprises a first database storing multidimensional data for a first software application, and a second database storing multidimensional data for a second software application. The system further includes an interface by which an administrator defines a link that specifies a source area of the first database and a target area of the second database. A link control module automatically moves multidimensional data from the source area to the target area in accordance with the link.

In another embodiment, a method comprises defining a link from a first software application to a second software application, wherein the link specifies a source area of a multidimensional database associated with the first software application and a target area of a multidimensional database associated with the second software application. The method further comprises automatically moving multidimensional data from the source area to the target area in accordance with the link.

In another embodiment, a computer-readable medium comprises instructions to cause a processor to present a user interface to receive input specifying a first software application, a second software application, a source data cube associated with the first software application, a source dimension of the source data cube, at least one items along the source dimension, a target data cube associated with the second software application, a target dimension of the target data cube, and at least one target item of the target dimension. The instructions further cause the processor to automatically move multidimensional data associated with the source items of the source data cube to the target items of the target data cube.

The invention may provide one or more advantages. For example, in some embodiment, the techniques may be used to automatically move multidimensional data between enterprise software systems while the software systems remain active. As a result, users of the respective enterprise software systems may continue to interact with the systems.

In addition, the techniques may allow an enterprise to utilize an efficient set of enterprise databases that are architected with the appropriate size and dimensionality for the associated business processes. As a result, the enterprise need not utilize a single, monolithic database that stores all of the multidimensional data for the enterprise.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 6-15 are exemplary screen illustrations of a user interface for defining, maintaining and monitoring enterprise software links described herein.

DETAILED DESCRIPTION

Figure 1:
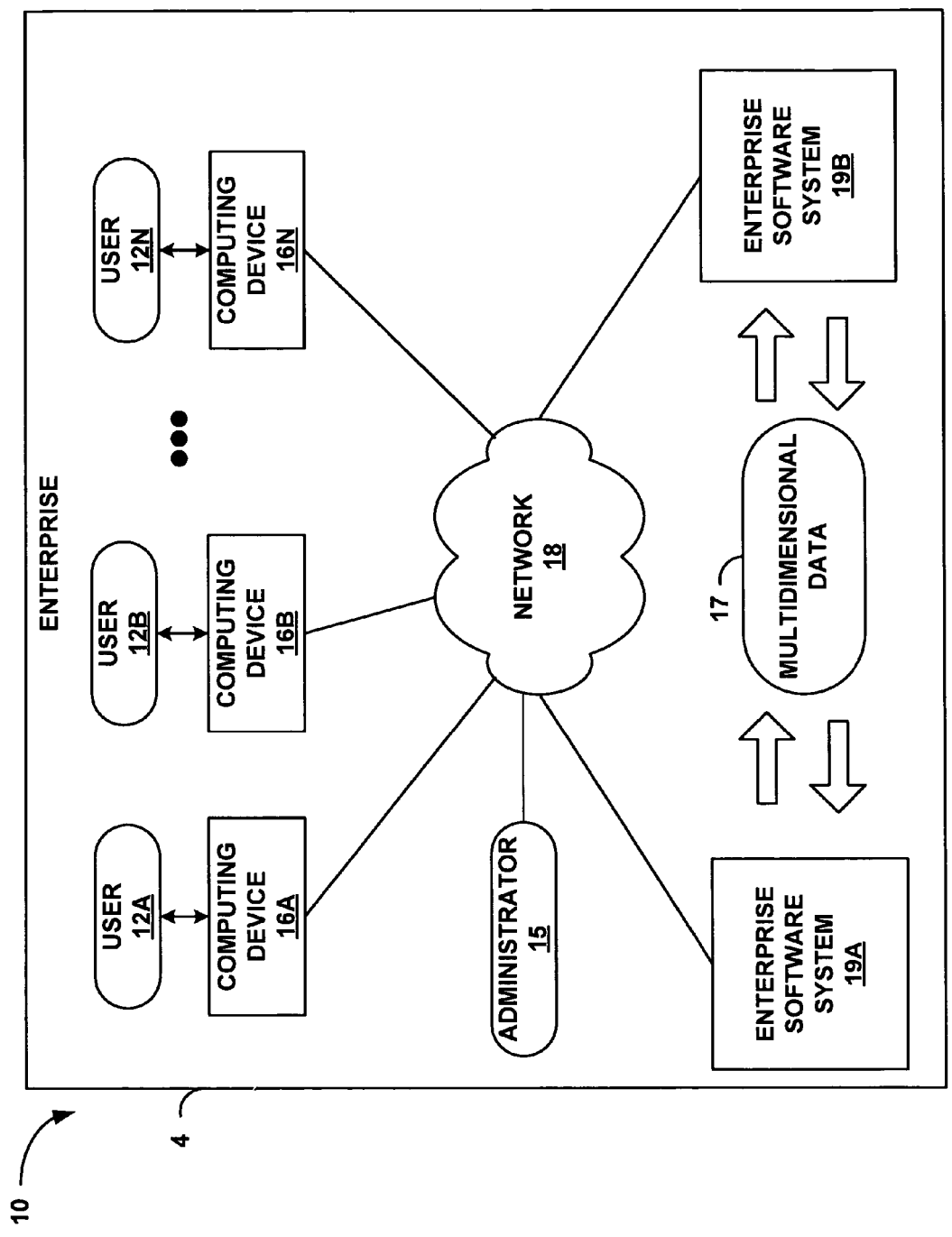
FIG. 1 is a block diagram illustrating an example computing environment in which users interact with a plurality of enterprise software systems.

FIG. 1 is a block diagram illustrating an example computing environment 10 in which a plurality of users 12A-12N (collectively, "users 12") interact with a plurality of enterprise systems 19A and 19B (collectively "enterprise systems 19"). In the system shown in FIG. 1, enterprise systems 19 are communicatively coupled to a number of computing devices 16A-16E (collectively, "computing devices 16") by a network 18.

Enterprise users 12 may use a variety of computing devices 16 to interact with enterprise software systems 19 via network 18. For example, an enterprise user 12 may interact with enterprise software systems 19 using a laptop computer, desktop computer, or the like, running a web browser, such as Internet Explorer™ from Microsoft Corporation of Redmond, Wash. Alternatively, an enterprise user may use a personal digital assistant (PDA), such as a Palm™ organizer from Palm Inc. of Santa Clara, Calif., a web-enabled cellular phone, or similar device.

Network 18 represents any communication network, such as a packet-based digital network like the Internet. In this manner, computing environment 10 can readily scale to suit large enterprises. Enterprise users 12 may directly access enterprise software systems 19 via a local area network, or may remotely access enterprise software systems 19 via a virtual private network, remote dial-up, or similar remote access communication mechanism.

In general, enterprise software systems 19 may be any type of enterprise software system that utilizes multidimensional data. For example, the techniques described herein may be readily applied to order management systems, inventory management systems, sales force management systems, business intelligence tools, enterprise reporting tools, project and resource management systems and other enterprise software systems.

For exemplary purposes, the invention is described in reference to an enterprise planning system, such as an enterprise financial or budget planning system. In particular, it is assumed that enterprise software system 19A represents a large-scale, web-based enterprise planning system. Enterprise software system 19B may also represent an enterprise planning system for planning other business processes. Alternatively, enterprise software system 19B may be any other type of enterprise software system.

In this example, enterprise software system 19A enables and automates the reconciliation of top-down targets with detailed bottom-up forecasts for an enterprise. Enterprise software system 19A implements and manages an enterprise planning process, which generally consists of three functions: (1) modeling, (2) contribution and (3) reconciliation.

Initially, high-level enterprise managers or executives, referred to as analysts, define organizational targets, and build planning models for the enterprise. The analysts may include, for example, financial analysts, such as the chief financial officer, senior financial analysts or product and sales analysts. More specifically, the analysts develop a model having a number of hierarchically arranged nodes representing various cost centers within the organization, such as business units or departments. The analysts then specify corporate target data for each node of the organizational hierarchy. Corporate target data may include financial data, revenue data, order data, inventory data, and the like, depending on the particular enterprise planning activity being carried out by the enterprise. The analysts then assign one or more enterprise users 12 to each node, such as managers, supervisors, sales representatives, lab managers, or the like, that are responsible for enterprise planning for the cost center corresponding to the node. Each enterprise user 12 may be designated as a contributor that provides planning data to enterprise software system 19A, a reviewer that accepts or rejects contributions from the contributors, or both. The contributors and reviewers may be authorized users within the enterprise or within other entities coupled to network 18, such as suppliers or customers.

The enterprise users 12 that are designated as contributors interact with enterprise software system 19A to input detailed forecasts in the form of contribution data. As described above, enterprise users 12 may provide detailed financial forecasts, revenue forecasts, order forecasts, inventory forecasts, estimated resource requirements, and the like, depending on the particular enterprise planning activity being carried out by the enterprise.

Enterprise software system 19A automates the reconciliation of the forecast data with the corporate target data provided by the analysts. In particular, enterprise software system 19A operates in accordance with a defined model, i.e., the enterprise planning model created by the analysts, to provide a hierarchical planning process having multiple reconciliation levels. As each of the contributors provides his or her contribution data (referred to generally, as "enterprise data"), enterprise software system 19A automatically aggregates the contribution data across the enterprise in real-time, and provides access to the aggregated data to enterprise users 12 designated as reviewers associated with higher levels of the enterprise. In particular, upon receiving contribution data from the contributors, enterprise software system 19A identifies all higher levels of the organizational model affected by the newly received contribution data, and calculates new aggregate totals at each level in real-time.

Consequently, the reviewers view aggregated data across the enterprise in real-time during the enterprise planning session. At each level, enterprise software system 19A ensures that the reviewers, as defined by the nodes of the enterprise model, reconcile the target data with the forecast data. Each of the reviewers may, for example, reject or accept the contribution data in view of corporate targets provided by the analysts. This process continues until the contribution data is ultimately approved by the highest level of the organizational hierarchy, thereby ensuring that the contribution data from the contributors reconciles with corporate targets provided by the analysts.

In this manner, enterprise software system 19A may provide more accurate enterprise planning than with conventional techniques. For example, enterprise software system 19A may improve the accuracy and predictability of enterprise planning by enabling organizations to reconcile corporate models and organizational targets with detailed forecasts. The techniques may provide a platform that delivers collaborative, real-time planning capabilities, without requiring offline consolidation and aggregation of forecasts. Because enterprise software system 19A can aggregate contribution data in real-time, all users 12 can be presented with an accurate, up-to-date view of the numbers. Further, the architecture of enterprise software system 19A can readily scale to thousands of users, and may be designed around best planning practices. In addition, the techniques enabling high participation by enterprise users 12, i.e., the contributors and reviewers, allowing accurate planning cycles to be reduced.

Enterprise software system 19A may utilize a "cut-down" process by which the multidimensional data store is "sliced" for each user 12 in accordance with the defined enterprise model. During this process, enterprise software system 19A identifies areas of the defined model to which users 12 are assigned, either as contributors or reviewers, and "slices" the data store based on the assignments. When a given user 12 logs in and proceeds with an enterprise planning activity, enterprise software system 19A communicates the respective data slice to the respective computing device 16 for display to the user via the extended spreadsheet application. In this fashion, enterprise software system 19A need not communicate the entire model to each of users 12, thereby reducing communication time as well as resource requirements. Instead, each user 12 receives only relevant information. Users 12 interact with computing devices 16 to capture contribution data, and to reconcile the contribution data with organizational targets.

As described herein, enterprise software systems 19 provides interfaces by which administrator 15 defines "links" for automatically moving multidimensional data 17 between the enterprise software systems. As used herein, the term "link" generally refers to software element that maps data from one or more source enterprise software systems to one or more destination software systems. In this example, administrator 15 may define links for moving multidimensional data 17 from enterprise software system 19A to enterprise software system 19B. Similarly, administrator 15 may define links for moving multidimensional data 17 from enterprise software system 19B to enterprise software system 19A. Although illustrated for exemplary purposes as moving multidimensional data 17 from a single source enterprise software system to a single destination, the techniques described herein may readily be applied to move multidimensional data from one or more source enterprise software systems to one or more destination systems.

In addition to specifying the source and destination databases, administrator 15 may configure each link to specify one or more data transformations to be automatically applied when moving multidimensional data 17. In this manner, administrator 15 may define the links to control the mapping and synchronization of multidimensional data 17 between enterprise software systems 19, including control of past and future time versioning and dimensionality as the data is stored in each of the enterprise software systems.

In general, the links may be activated manually or automatically. For example, administrator 15 may interact with enterprise software systems 19 to define macros for automatically invoking the links at specific times or in response to certain events. Moreover, administrator 15 may chain together the macros, thereby defining an automated sequence of links for moving data between multiple databases.

As described in further detail below, enterprise software systems 19 allow administrator 15 to define the links with various levels of granularity. For example, administrator 15 may define a set of "administrative links" for moving larger data sets associated with multiple users 12. In addition, administrator 15 may define "user links" on a per-user basis to move user-specific multidimensional data. Individual users 12 may invoke the user links to initiate movement of multidimensional data 17 that is specific to a slice of the enterprise model to which the user has access. Enterprise software system 19A may, for example, present a user interface by which any of users 12 can initiate automated movement and transformation of multidimensional data 17 related to their data slice.

Figure 2:
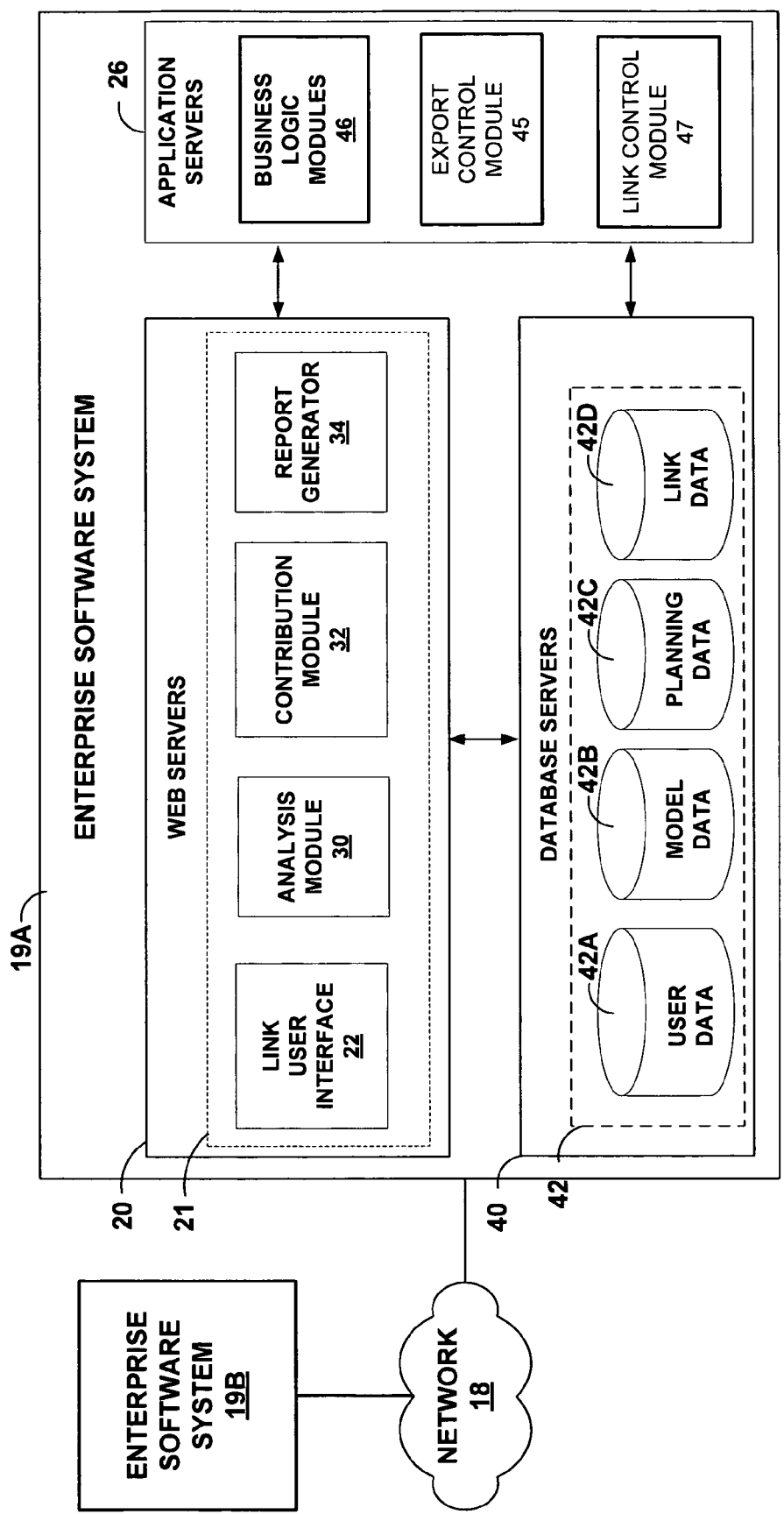
FIG. 2 is a block diagram illustrating one example embodiment of an enterprise software system in further detail.

FIG. 2 is a block diagram illustrating one embodiment of enterprise software system 19A in further detail. Again, for purposes of illustration, enterprise software system 19A is described in reference to an enterprise planning system, such as an enterprise financial or budget planning system. In the illustrated example, enterprise planning system 14 includes web servers 20, application servers 26 and database servers 40.

In general, web servers 20 provide an interface for communicating with users 12 via network 18. Web servers 20 execute web server software, such as Internet Information Server™ from Microsoft Corporation, of Redmond, Wash. As such, web servers 20 provide an environment for interacting with contributors, analysts, and reviewers according to software modules 21, which include link user interface 22, analysis module 30, contribution module 32, and report generator 34.

Software modules 21 typically take the form of instructions stored on computer-readable media for execution by one or more processors. Software modules 21 may comprise Visual Basic modules, Java scripts, Java Applets, Active Server Pages, web pages written in hypertext markup language (HTML) or dynamic HTML, Active X objects, documents conforming to the extensible markup language (XML) or other data description language, and other suitable modules. Web servers 20 serve up web pages defined by software modules 21, and communicate the web pages to computing devices of enterprise users 12. The web pages may include static media, such as text and graphic imagery, as well as conventional input media such as text entry boxes, radio buttons, drop-down menus, grids, spreadsheets and the like, for receiving information from enterprise users 12.

Software modules 21 interact with database servers 40 to access enterprise data 42 including user data 42A, model data 42B, planning data 42C and link data 42D. Enterprise data may be stored in a number of different forms including one or more data storage files, or one or more database management systems (DBMS) executing on one or more database servers. Furthermore, although illustrated separately, enterprise data 42 could be combined into a single database or other data storage structure. Enterprise data 42 could, for example, be implemented as a single relational database, such as SQL Server from Microsoft Corporation.

User data 42A reflects links to information for each of users 12, including the name, email address, and other contact information for the user. Model data 428 stores the enterprise planning models defined by analysts. For example, model database 42B stores information that defines the reconciliation process developed by the analysts, including the number of reconciliation levels, the various "nodes" in the hierarchy, and a contributor associated with each node. Planning data 42C stores the actual contribution data (i.e., "enterprise data") for each of the nodes for one or more planning sessions. Link data 42D stores data that defines links for automatically moving portions of multidimensional planning data 42C from enterprise software system 19A to enterprise software system 19B. In particular, link data 42D identifies and maps portions of planning data 42C to one or more multidimensional databases within enterprise software system 19B.

Referring again to software applications 21, link user interface 22 presents an interface with which administrator 15 interacts to define the links. In particular, administrator 15 interacts with link user interface 22 to specify a name and description for each link. In addition, administrator 15 may configure the link to define a data mapping by selecting source and target enterprise software applications, source and target multidimensional data cubes, and particular source and target dimensions. Moreover, administrator 15 may specify a mapping between individual items of the source and target dimensions, thereby controlling mapping and aggregation of the multidimensional data. Moreover, administrator 15 may interact with link user interface 22 to view status and execution information for each of the links.

Analysis module 30 includes one or more software modules for creating enterprise planning models, such as financial models for enterprise 4, to control the entire planning process. Contribution module 32 includes software modules for presenting a contribution interface for capturing contribution data from the contributors. Contribution module 32 captures and aggregates the contribution data across enterprise 4 in real-time, and provides access to the aggregated data to reviewers associated with higher levels of enterprise 4.

Report generator 34 includes analytical software modules that generate enterprise planning reports based on the contribution data received from the contributors and stored within planning data 42C. In particular, the analytical software modules allow users 12 to formulate complex queries for generating reports and performing other data analysis functions on the current data of the enterprise model. These software modules may be web-based modules having a browser interface, or may be stand-alone executable programs.

Business logic modules 46 execute within the operating environment provided by application severs 26 and provide functionality for accessing and processing the data stored within databases 42 in response to software modules 21. In particular, business logic modules 46 comprise software routines for implementing the enterprise planning functions, and are invoked by software modules 21.

Link control module 47 controls exportation and movement of portions of planning data 42C to one or more multidimensional databases within enterprise software system 19B in accordance with link data 42D. For example, link control module 47 may invoke one or more administrative jobs for automatically moving portions of planning data 42C in accordance with the link definitions maintained by link data 42D. During this process, link control module 47 may invoke export control module 45, which controls the export of consistent data from planning data 42C based on the source cubes and dimensions specified by the links. Further details with respect to export control module 45 and the exportation of a consistent data set from planning data 42C are described in U.S. patent application Ser. No. 10/996,855, entitled "EXPORT QUEUE FOR AN ENTERPRISE SOFTWARE SYSTEM," filed Nov. 22, 2004, hereby incorporated by reference.

Figure 3:
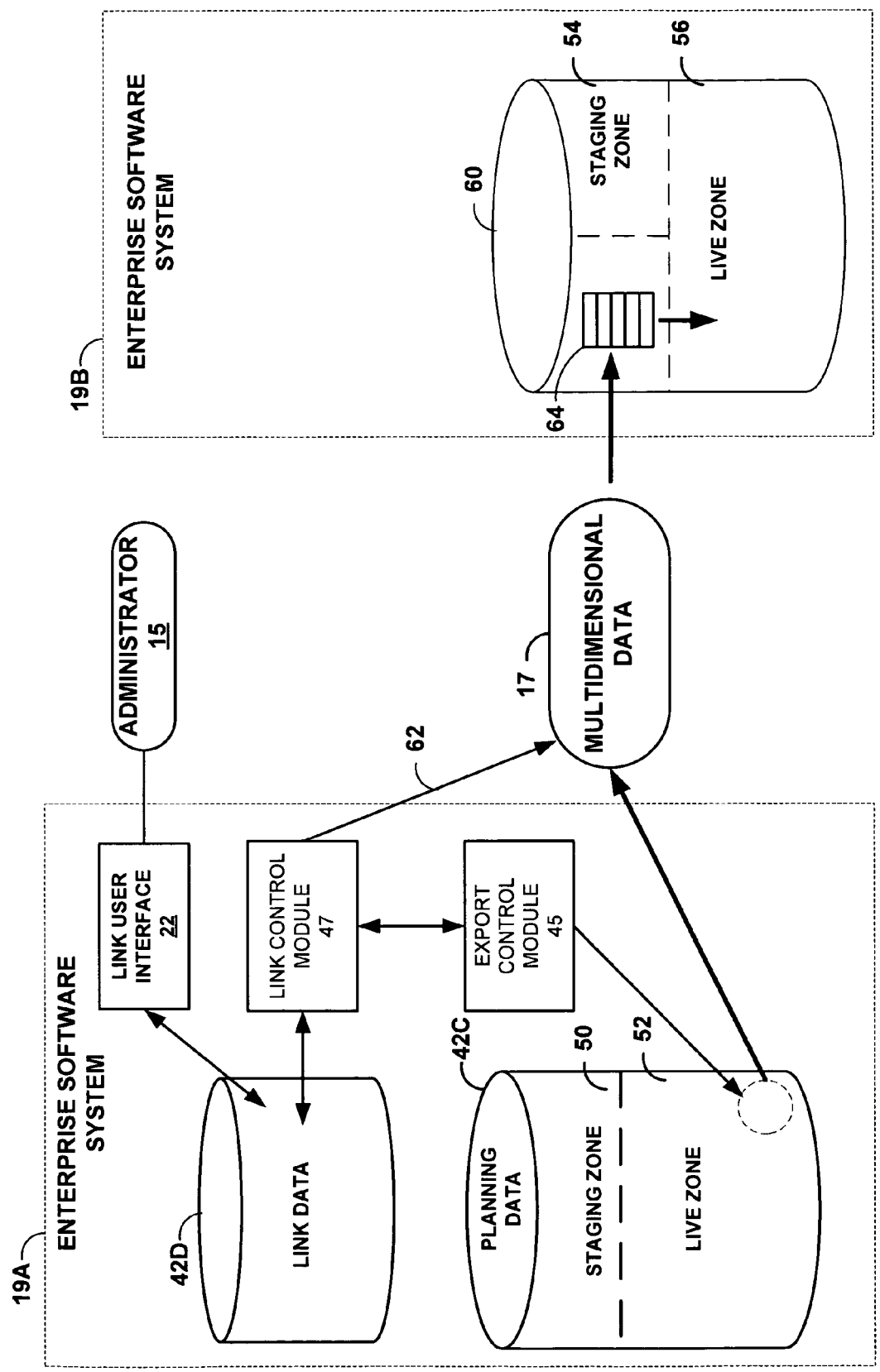
FIG. 3 is a block diagram illustrating an example multidimensional data transfer in further detail.

FIG. 3 is a block diagram illustrating an example multidimensional data transfer in further detail. In particular, FIG. 3 illustrates transfer of multidimensional data 17 from enterprise software system 19A to enterprise software system 19B in response to activation of an administrative link.

As illustrated in FIG. 3, planning data 42C includes a staging zone 50 and a "live zone" 52. In general, live zone 52 stores active planning data that is "current" from the perspective of users 12 of enterprise software system 19A. In contrast, staging zone 50 may be used as a temporary holding area while multidimensional data can be processed and merged into enterprise software system 19A. Similarly, enterprise software system 19B includes a database 60 having a staging zone 54 and a live zone 56.

In the example of FIG. 3, administrator 15 defines an administrative link to move multidimensional data 17 from live zone 52 of enterprise software system 19A to live zone 56 of enterprise software system 19B. In particular, link control module 47 coordinates with export control module 45 to move multidimensional data 17 from enterprise software system 19A to enterprise software system 19B where the data is imported directly within live zone 56 via import queue 64. In other words, multidimensional data 17 bypasses staging zone 54 of enterprise software system 19B and need not be processed as other imported data.

Figure 4:
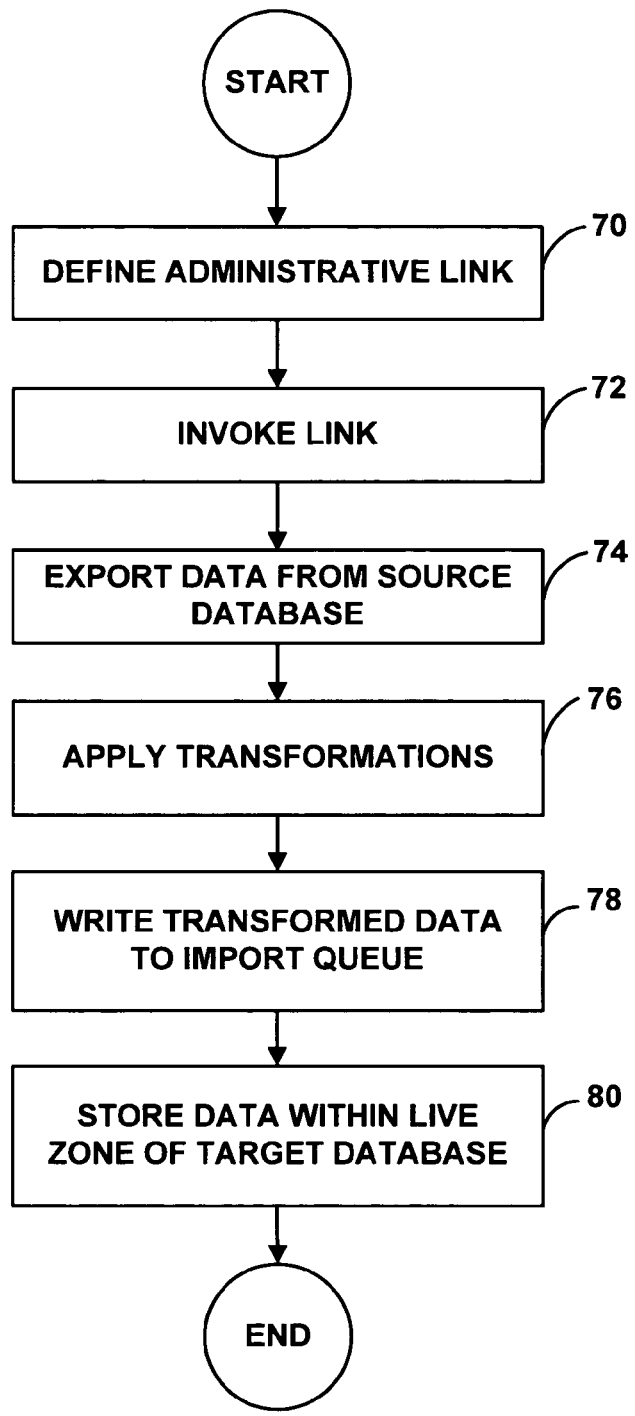
FIG. 4 is a flowchart illustrating exemplary operation of an enterprise software system.

FIG. 4 is a flowchart that describes exemplary operation of enterprise software system 19A with respect to the example of FIG. 3 in further detail. Initially, administrator 15 interacts with link user interface 22 to define an administrative link (70). As described, administrator 15 interacts with link user interface 22 to specify a name and description for each link. In addition, administrator 15 configures the link to define a data mapping from planning data 42C to database 60 as well as any transformations and aggregation to be applied to multidimensional data 17 during the move.

Next, link control module 47 invokes the link either in automated fashion in response to an internal or external system event or specified time period or in response to a manual request from administrator 15 (72). In particular, link control module 47 accesses link data 42D to retrieve the link definition supplied by administrator 15. Link control module 47 then directs export control module 45 to export a consistent set of planning data in accordance with the defined source of the link, e.g., the data cube, dimension and items of planning data 42C specified by the link definition (74).

Once exported, link control module 47 applies any data transformations 62 to multidimensional data 17 in accordance with the link definition (76). For example, link control module 47 may compute aggregate totals from source items of planning data 42C. Link control module 47 writes the transformed multidimensional data to import queue 64 (78) for direct storage in live zone 56 in accordance with the dimensionality of database 60 (80). In this manner, enterprise software system 19B need not perform data manipulation or otherwise transform multidimensional data 17.

Figure 5:
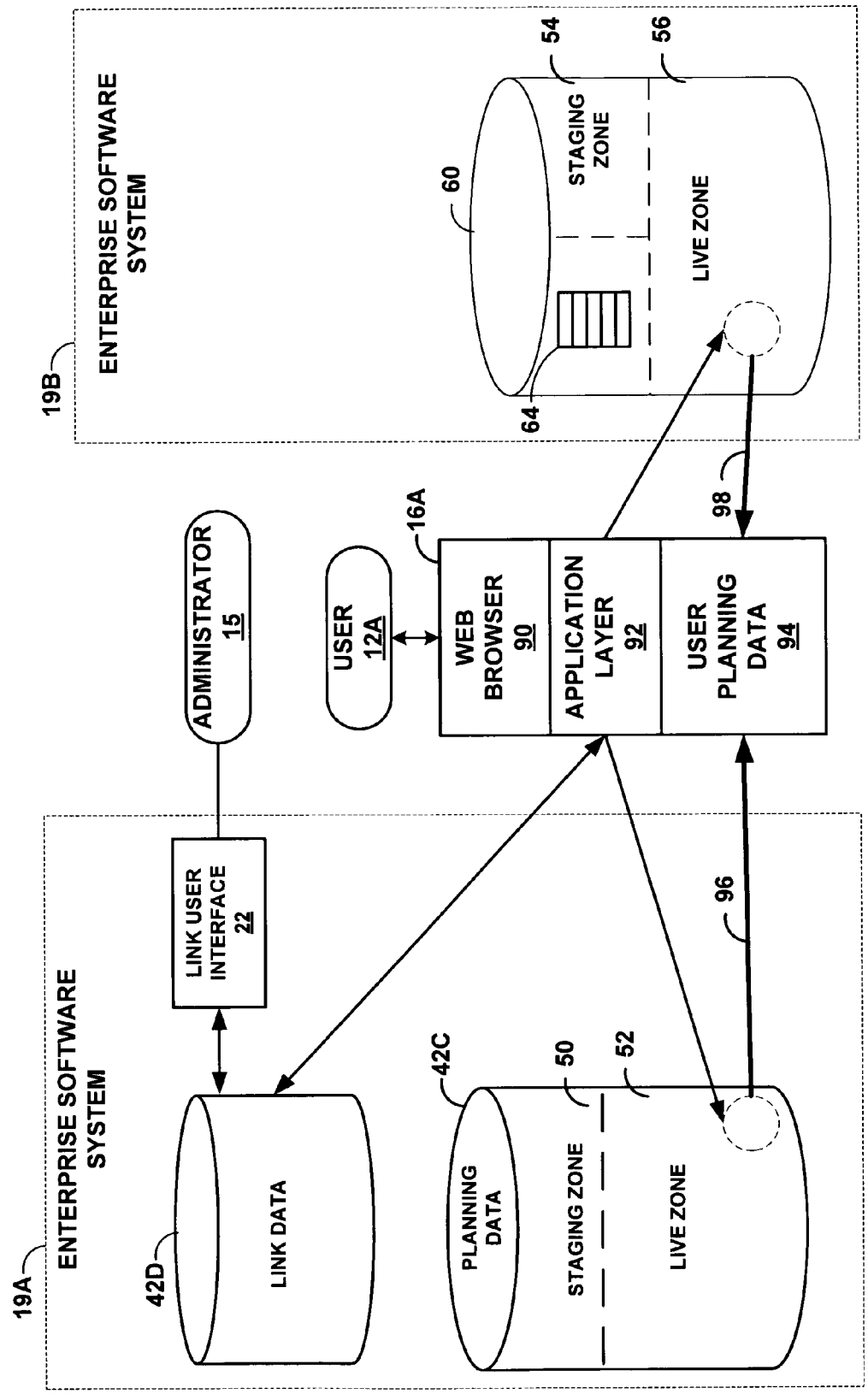
FIG. 5 is a block diagram illustrating another example of a multidimensional data transfer.

FIG. 5 is a block diagram illustrating another example of a multidimensional data transfer. In particular, FIG. 5 illustrates transfer of multidimensional data 17 from enterprise software system 19A to enterprise software system 19B in response to activation of a user link.

In the example of FIG. 5, administrator 15 interacts with link user interface 22 to define a user-controlled link. In particular, administrator 15 defines a user link that maps multidimensional data from live zone 52 of enterprise software system 19A to live zone 56 of enterprise software system 19B. However, administrator 15 defines the link as a "user link," thereby allowing users, such as user 12A, to manually activate the link for their respective portion of planning data 42C.

Initially, user 12A accesses enterprise software system 19A via computing device 16A. In this example, computing device is illustrated to include a web browser 90 or other user interface layer software. In addition, computing device 16A includes application layer 92 that represent business layer software for carrying out the planning process.

At the request of user 12A, application layer 92 retrieves personal planning data 96 for the user, i.e., the "slice" of the planning data 42C associated with the user. Application layer 92 downloads and stores the requested slice as user planning data 94. In addition, application layer 92 downloads the user link from link data 42D for which user 12A is authorized.

Next, user 12A manually invokes the user link, thereby directing application layer 92 to retrieve additional user-specific multidimensional data 98 from live zone 56 of enterprise software system 19B. Often; user 12A need not even know of the source database from which multidimensional data 98 was retrieved as administrator 15 defined and configured the user link. Application layer 92 performs a consistent read of multidimensional data 98 from live zone 56 and downloads the multidimensional data into user planning data 94. Application layer 92 then stores user planning data 94, including multidimensional data 98 retrieved from database 60, to planning data 42C when user 12A performs a save.

Figure 6:
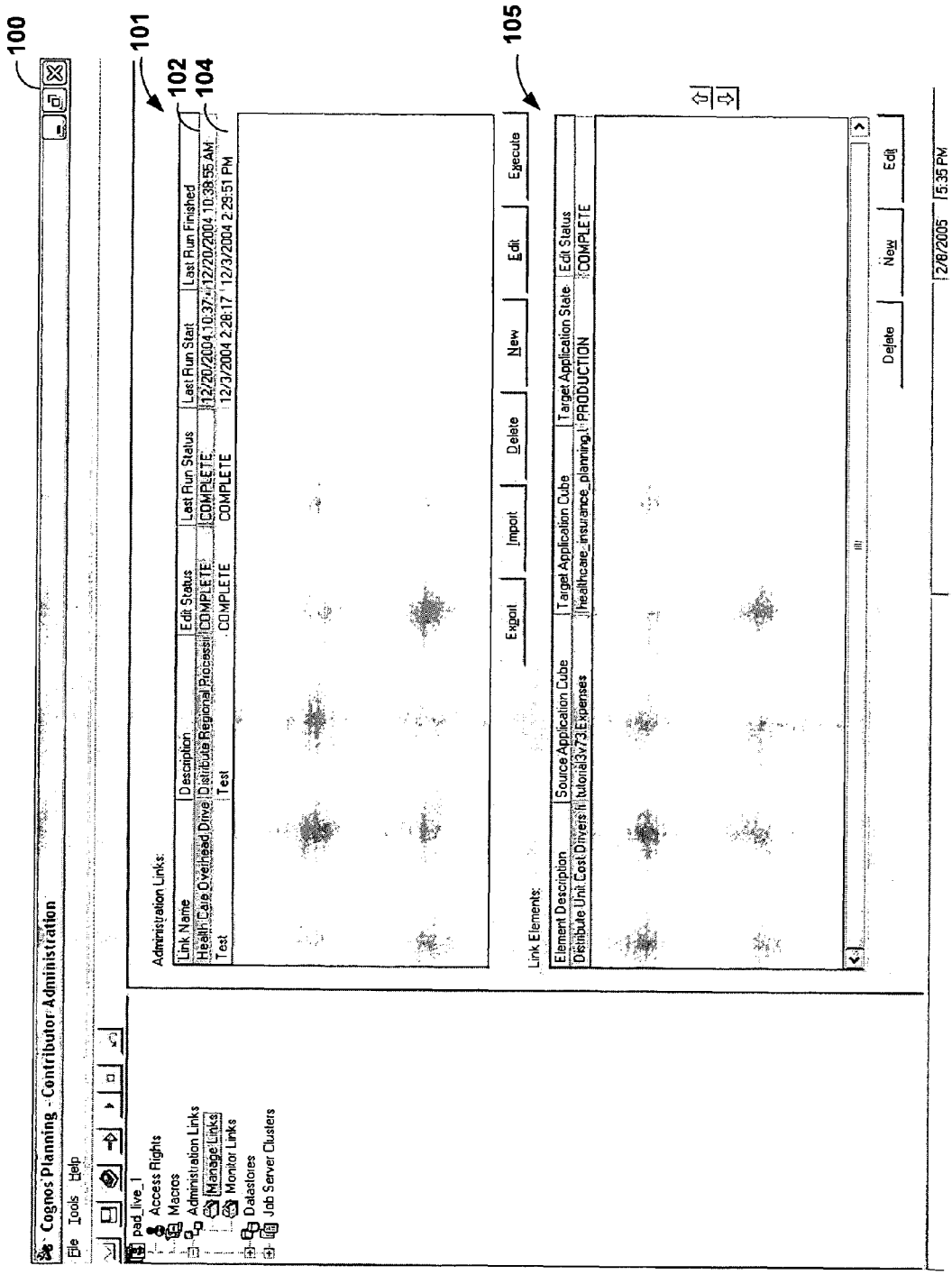
Figure 8:
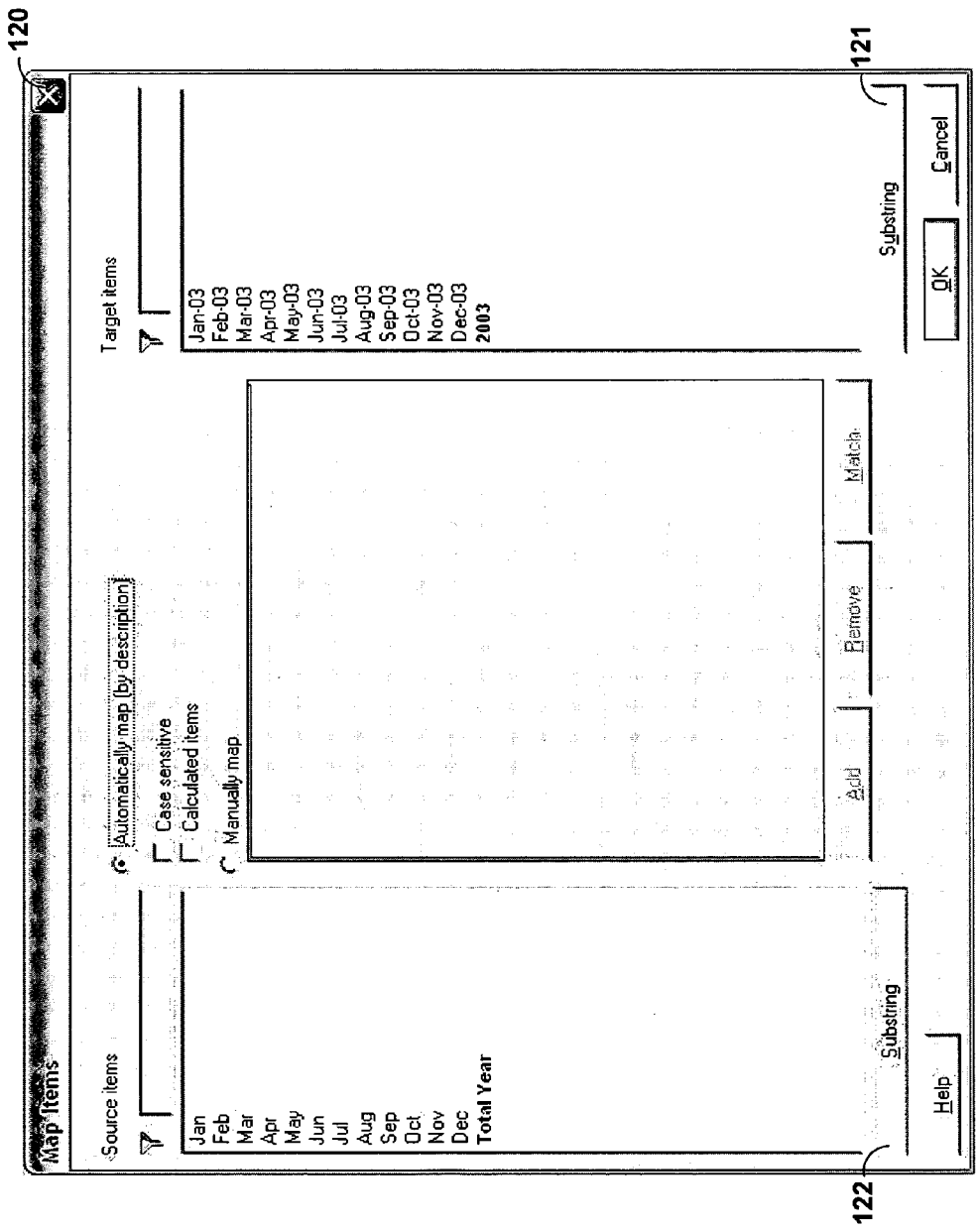

FIGS. 6-15 are exemplary screen illustrations presented by link user interface 22 for defining, maintaining and monitoring enterprise software links described herein. For example, FIG. 6 is a screen illustration of an example user interface 100 listing administrator links 102, 104. As illustrated, user interface 100 includes a display region 101 that lists a link name, description, edit status, last run status, an execution start time and an execution end time for each of links 102, 104. In addition, user interface 100 includes display region 105 that lists mapping information for a selected one of the links listed within display region 101. In this example, display region 105 presents mapping information for link 102, which is selected within display region 101. In particular, display region 105 lists a description of the elements associated with link 102, a source multidimensional cube, a target multidimensional cube and an edit status for the link.

FIG. 7 is a screen illustration of an example user interface 110 with which administrator 15 interacts to create a new administrative link. In this example, user interface includes an input area 111 for receiving a description of link being created. In addition, input areas 112, 113 allow administrator 15 to select a source enterprise software application and a target enterprise software application, respectively.

User interface 110 further includes input areas 114, 115 for selection a source data cube from the source software application and a target data cube for the target enterprise software application. For the selected cubes, input areas 116, 117 allow administrator 15 to map particular dimensions. Upon selecting map button 118, link user interface 22 presents user interface 120 (FIG. 8) that allows administrator 15 to map individual items from a source dimension to one or more items along a target dimension. In this example, administrator 15 maps items along a "4 months" source dimension to items along a "months" dimension of the target multidimensional cube.

Figure 9:
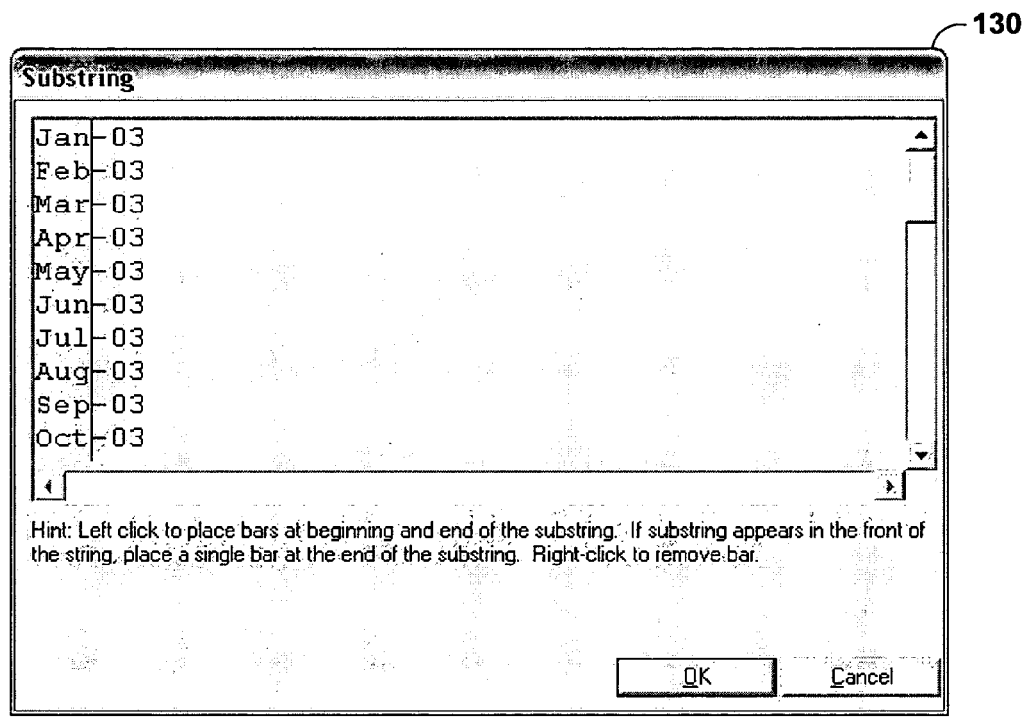
Figure 10:
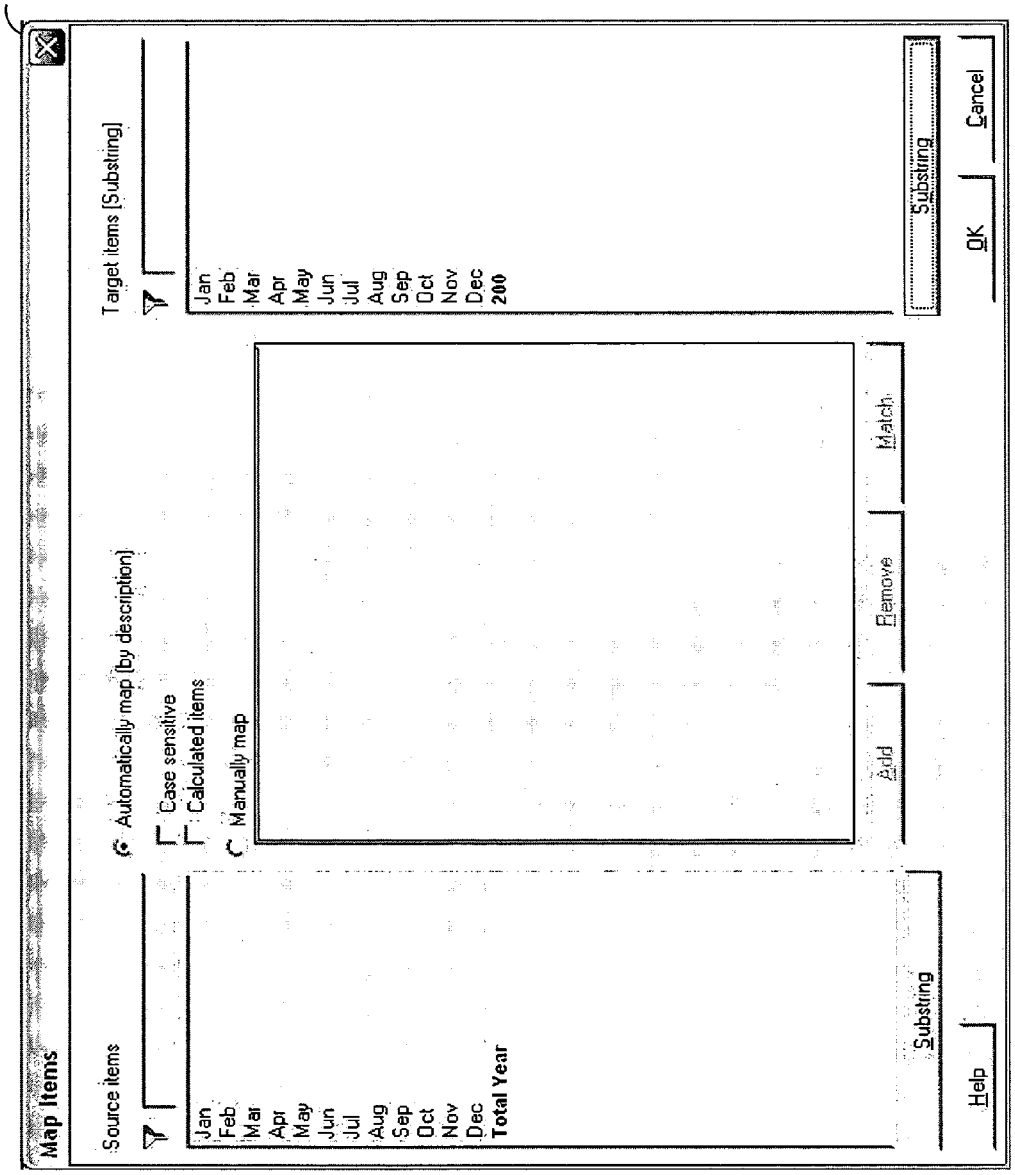

User interface 120 includes substring buttons 121, 122 that allow administrator 15 to perform link "cleansing" via substring. In particular, substring buttons 121, 122 allow administrator 15 to define string-based transformations for individual items. FIG. 9, for example, illustrates a user interface 130 by which administrator 15 defines substrings within items for the target "months" dimension. In this example, administrator 15 defines the substring to eliminate the last three characters from each of the items. As a result, the source items and the target items have matching string names, as illustrated in user interface 140 of FIG. 10. This example illustrates one of several types of mapping and cleansing capabilities that allow a user to match and map data. For example, link user interface 22 permits mapping as well as matching. Thus, the following are additional examples illustrating the cleansing and mapping functionality: (a) mapping of "month 1" through "month 12" to "January-2008" through "December-2008" for a calendar year organization, (b) mapping "mon 1" through "mon 12" to "July 05" through "June 06" for a fiscal year organization, and (c) cleansing and mapping "2005-January" to match "January" through use of a substring selecting only the 6th through 8th digit.

Figure 11:
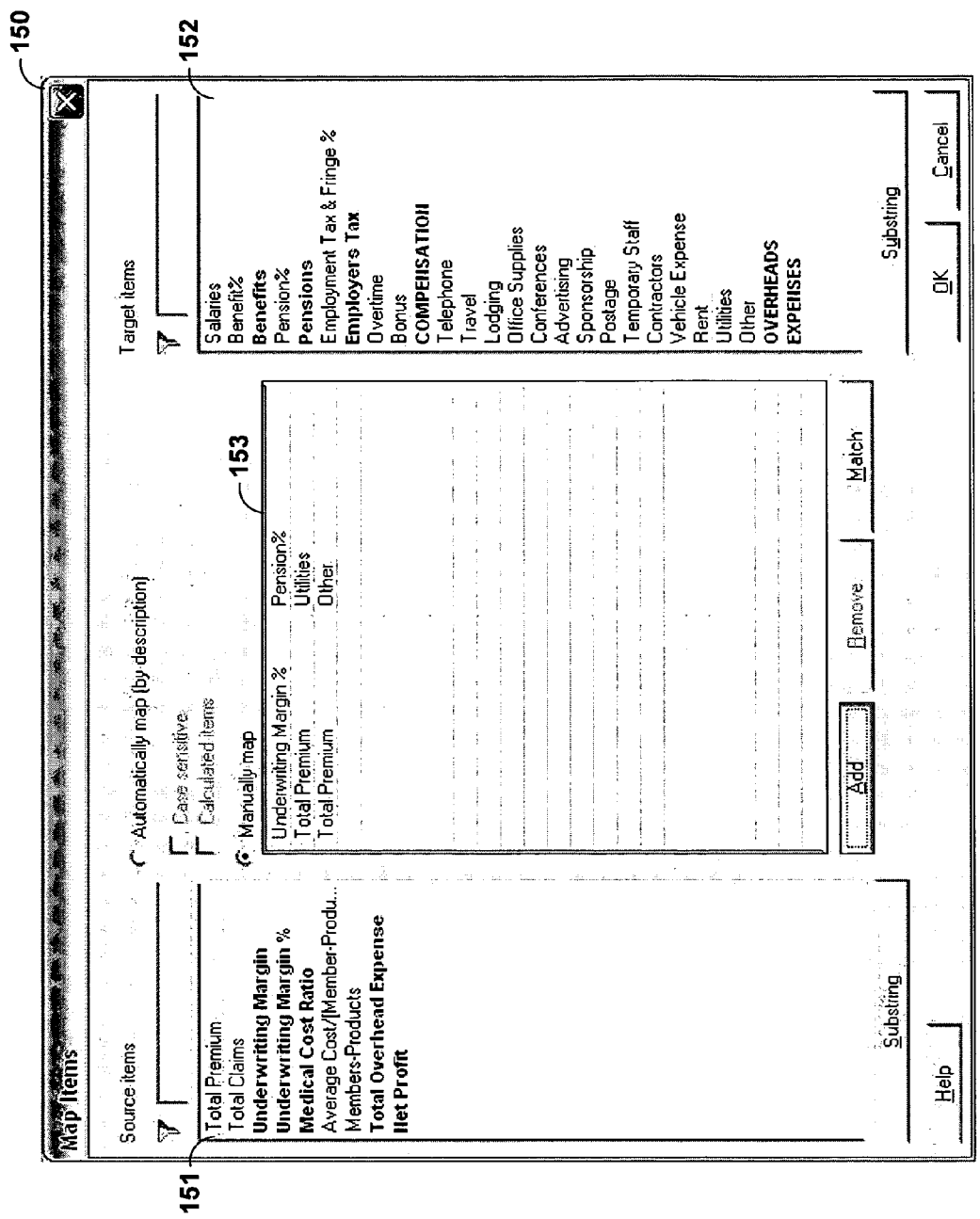

FIG. 11 is a screen illustration of an example user interface 150 in which administrator 15 has elected to manually map individual items between a source dimension and a target dimension. In particular, user interface 150 includes a display area 151 that lists source items along the source dimension, a display area 152 that lists target items along the target dimension, and a mapping area 153 that lists mapping information for the items.

In this example, administrator 15 has mapped source item "Underwriting Margin %" to the target item "Pension %." In addition, administrator 15 has mapped "Total Premium" source item to both "Utilities" and "Other" target items. In other words, amounts for the "Total Premium" dimensional item of the source data cube will be stored to both the "Utilities" and "Other" target dimensional items of the target data cube. In this manner, administrator 15 may define a 1-to-1 mapping or even an N-to-1 mapping from target to source items.

Figure 12:
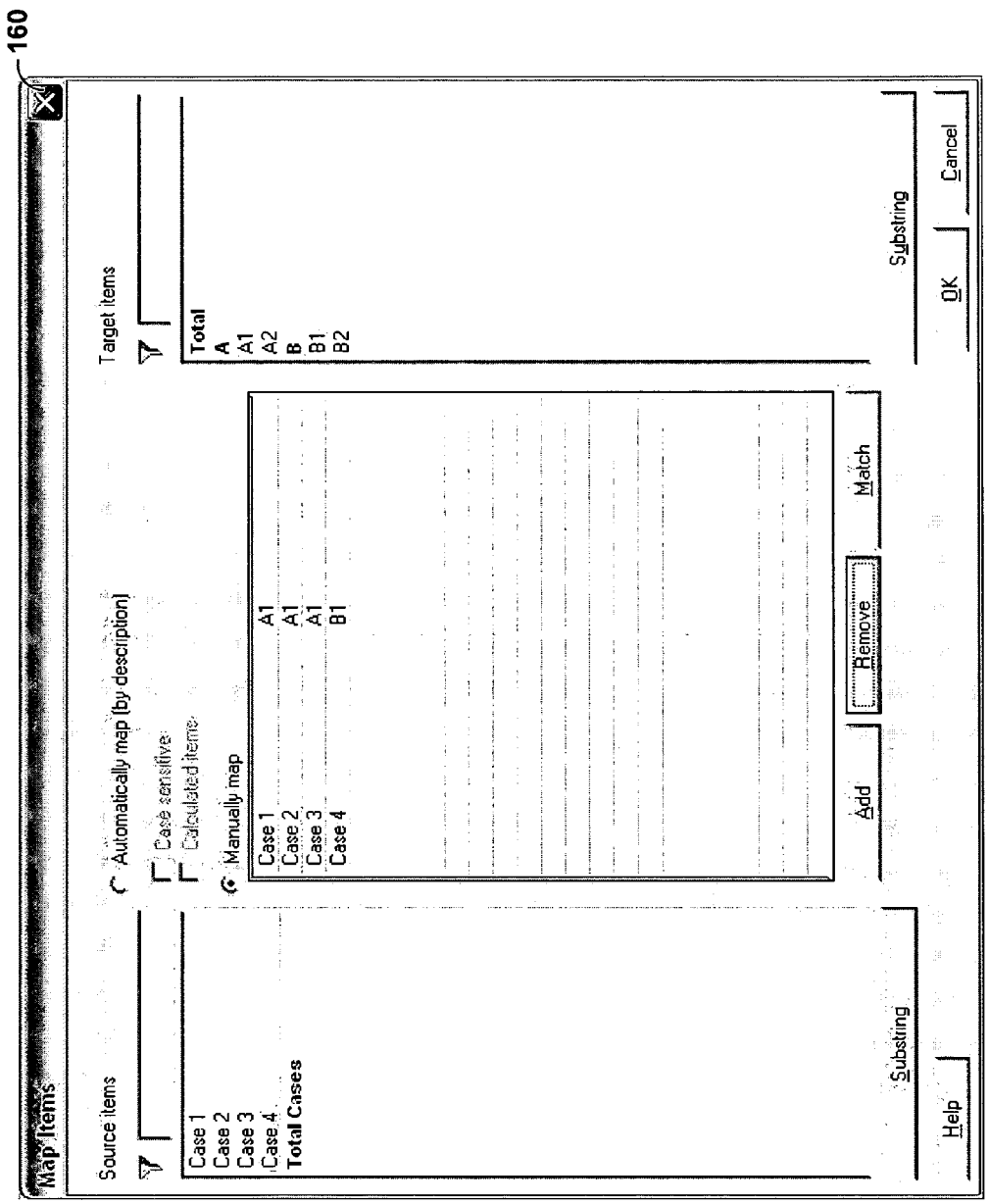

FIG. 12 is a screen illustration of an example user interface 160 in which administrator 15 has defined a manual mapping of source items "Case 1," "Case 2" and "Case 3" to target item "A1." In this manner, administrator 15 may define an N-to-1 data aggregation to be carried out when the link is invoked. In addition, administrator 15 has mapped source item "Case 4" to target item "B1."

Figure 13:
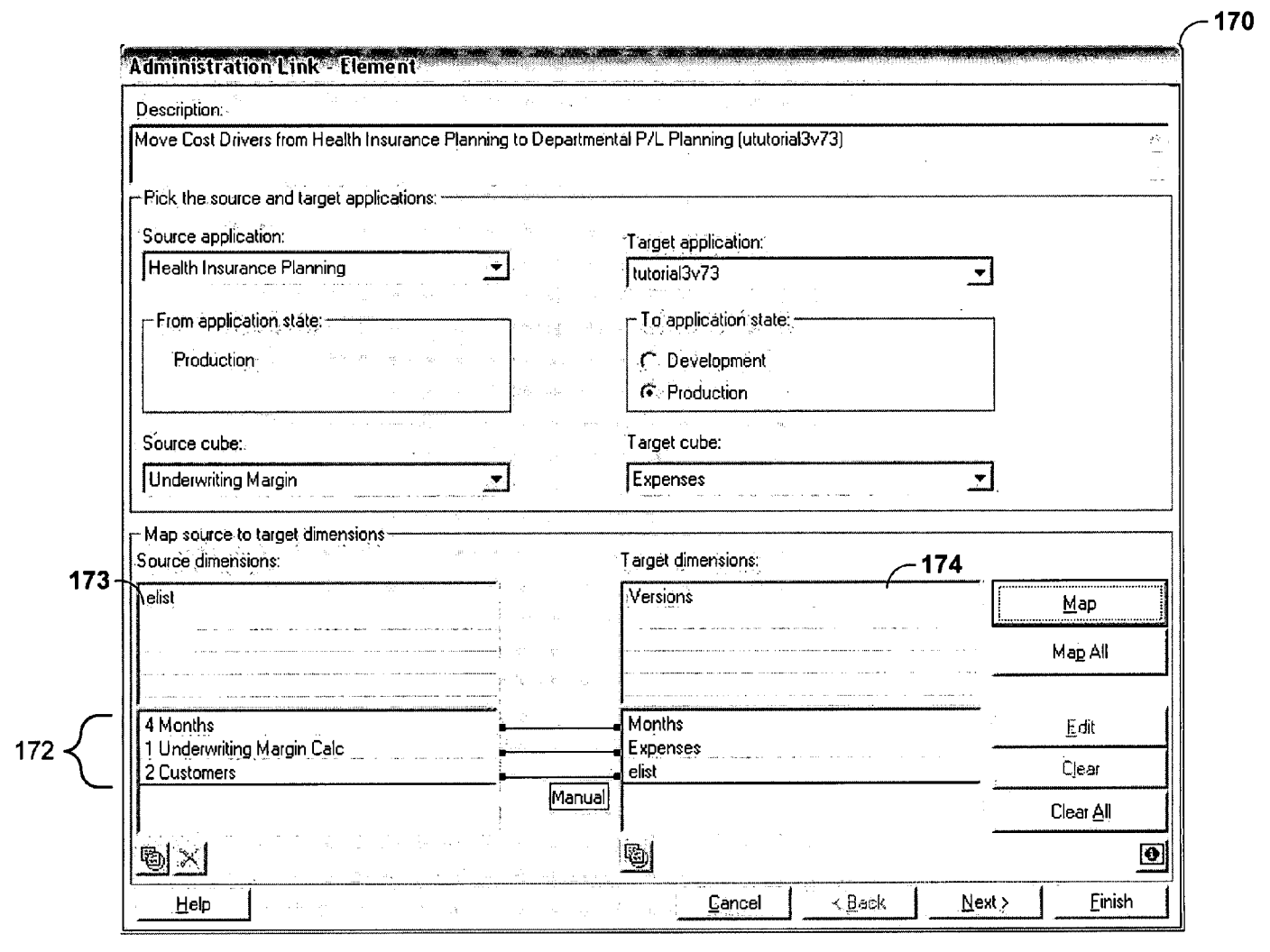

FIG. 13 is a screen illustration of an example user interface 170 in which three dimensions 172 have been mapped between the source and target multidimensional data cubes. User interface 170 also indicates that source dimension 173 and target dimension 174 have not been mapped.

Figure 15:
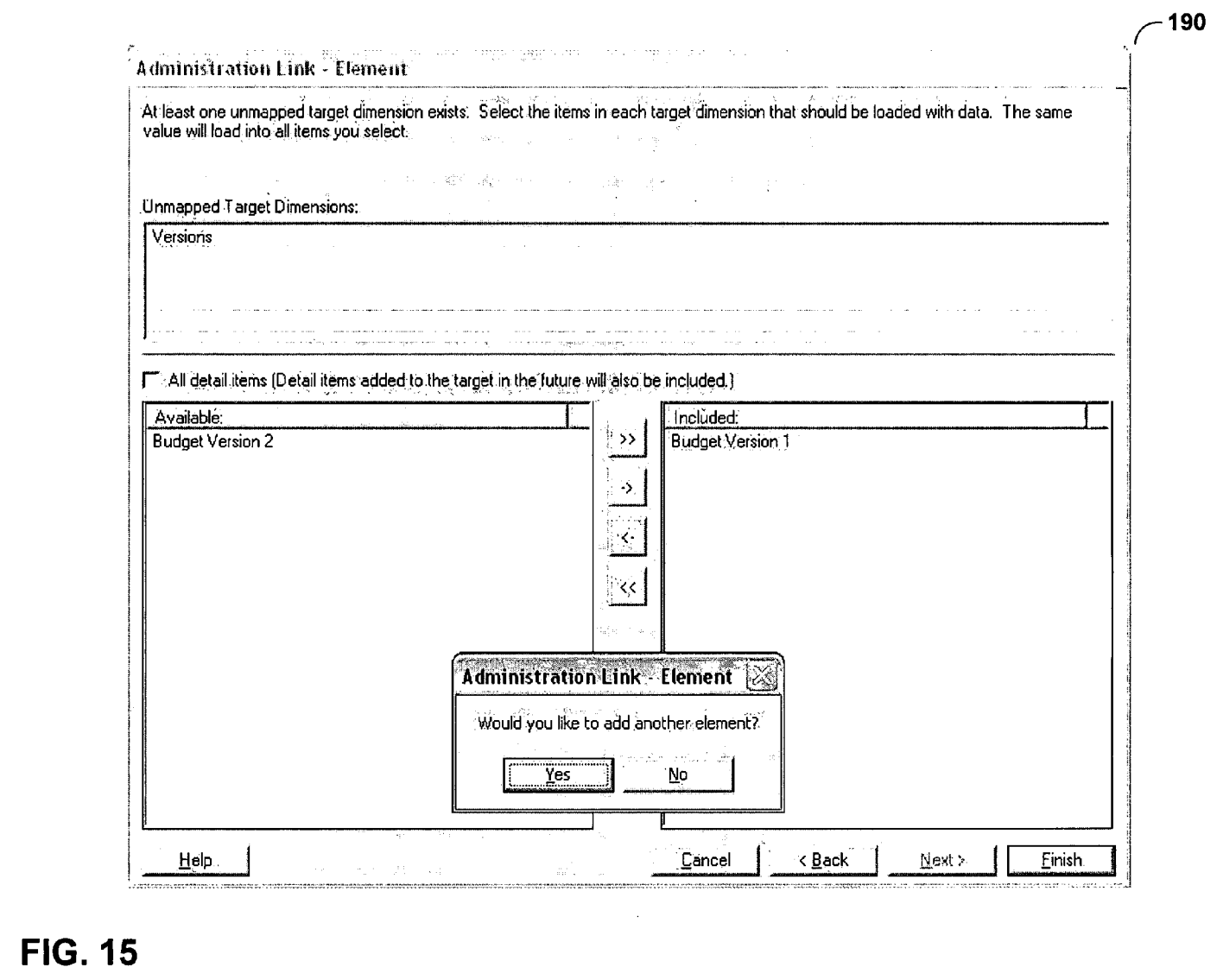

FIG. 14 is a screen illustration of an example user interface 180 with which administrator 15 interacts to handle unmapped source dimensions. As illustrated, user interface 180 includes a display area 181 that lists available items for the unmapped dimension, and a display area 182 that lists items of the dimension to be included and available for aggregation and data movement. In this example, administrator 15 has enabled selection box 183, thereby specifying that all future items added to the source dimension will also be included. In similar, manner, FIG. 15 is a screen illustration of an example user interface 190 with which administrator 15 interacts to handle unmapped target dimensions. Presenting unmapped target dimensions ensures that administrator 14 will apply business decision-making to decide whether only some or all items on the unmapped target dimensions will receive the data values computed by the link.

Various embodiments of the invention have been described. Although described in reference to an enterprise planning system, such as an enterprise financial or budget planning system, the techniques may be readily applied to other software systems, including other large-scale enterprise software systems. Examples of other enterprise software systems include order management systems, inventory management systems, sales force management systems, business intelligent tools, enterprise reporting tools, project and resource management systems and other enterprise software systems. Moreover, the techniques may be implemented on any type of computing device, including servers, client computers, laptops or other devices. These and other embodiments are within the scope of the following claims.

The invention claimed is:

1. A method for exporting data from a software system comprising:
defining a link from a first software application to a second software application by:

identifying a source data cube associated with the first software application and a target data cube associated with the second software application, identifying a source dimension of the source data cube and a target dimension of the target data cube, and defining a mapping between one or more items of the source dimension and one or more items of the target dimension, wherein the link specifies a live source area storing current multidimensional data in the source data cube of a multidimensional database associated with the first software application and a live target area of a multidimensional database storing current multidimensional data in the target data cube associated with the second software application, wherein the multidimensional database of the second software application includes a staging area to process import data to be imported into the second software application, wherein the staging area of the second software application is separate from the live target area of the second software application; and automatically moving, by a computer, multidimensional data from the live source area directly to the live target area in accordance with the link by bypassing the staging area of the second software application.

2. The method of claim 1, wherein automatically moving multidimensional data includes moving the multidimensional data in accordance with the mapping.

3. The method of claim 1, further comprising:

defining at least one data transformation; and applying the transformation to the multidimensional data when moving the multidimensional data from the source area to the target area.

4. The method of claim 1, wherein defining the link comprises defining a data aggregation that maps a plurality of items along the source dimension to one item along the target dimension.

5. The method of claim 1, wherein defining the link comprises mapping an item along a source dimension to a plurality of items along a target dimension.

6. The method of claim 1, further comprising:

defining a schedule for invoking the link; and automatically moving the multidimensional data in accordance with the schedule.

7. The method of claim 1, wherein defining the link comprises defining an administrative link, and wherein automatically moving multidimensional data comprises executing one or more administrative jobs to move the multidimensional data.

8. The method of claim 1, further comprising:

downloading multidimensional planning data to a client device of a user;

automatically moving the multidimensional data from the source area into the planning data upon manual invocation of the link by the user; and saving the planning data to the target area from the client device.

9. The method of claim 1, wherein automatically moving multidimensional data comprises exporting a consistent set of data from the source area.

10. The method of claim 1, wherein automatically moving multidimensional data comprises automatically moving the multidimensional data from the source area to an import queue of the second software application, wherein the import queue executes within the live target area of the multidimensional database of the second software application.

* * * * *